No. 635,334. Patented Oct. 24, 1899.
G. H. MERRITT.
DEVICE FOR OILING PISTON RODS.
(Application filed Jan. 3, 1899.)
(No Model.)

Witnesses:
H. W. Robinson
Chas. F. Stewart

George H. Merritt
Inventor.
by Gardner Merritt
his Attorney

THE NORRIS PETERS CO., PHOTO-LITHO., WASHINGTON, D. C.

UNITED STATES PATENT OFFICE.

GEORGE H. MERRITT, OF SAG HARBOR, NEW YORK.

DEVICE FOR OILING PISTON-RODS.

SPECIFICATION forming part of Letters Patent No. 635,334, dated October 24, 1899.

Application filed January 3, 1899. Serial No. 700,939. (No model.)

*To all whom it may concern:*

Be it known that I, GEORGE H. MERRITT, a citizen of the United States, residing at Sag Harbor, in the county of Suffolk and State of New York, have invented a new and useful Improvement in Devices for Oiling Piston-Rods or Valve-Stems Inside of the Stuffing-Box, of which the following is a specification.

My invention relates to oiling piston-rods or valve-stems on engines; and the object of my invention is to provide a continuous lubrication of the piston-rods or valve-stems and to reduce the friction of the same.

Figure 1:
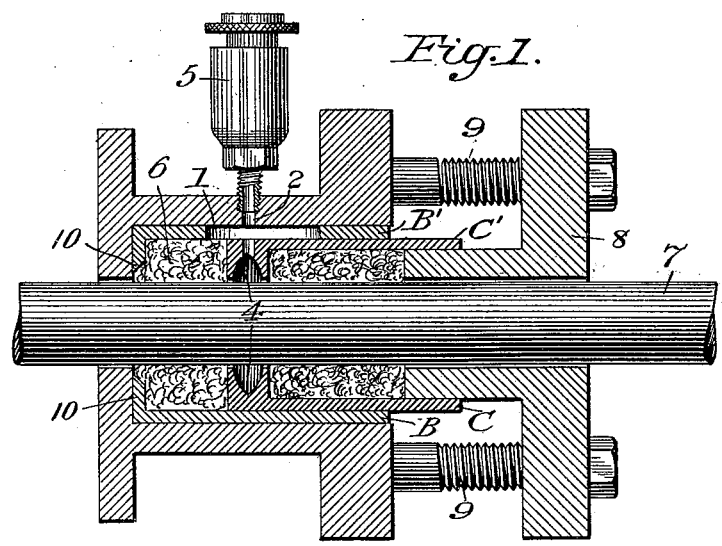
Figure 2:
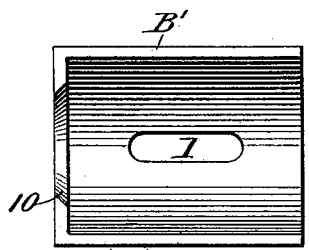
Figure 3:
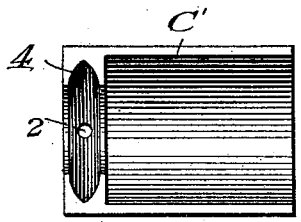
Figure 4:
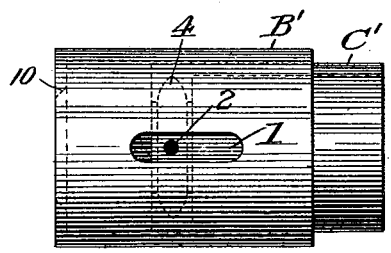

In the accompanying drawings, Figure 1 is a transverse section. Fig. 2 is a view of the part B'. Fig. 3 is a view of the part C'. Fig. 4 is a view of the parts B' and C' in combination.

Similar figures and letters refer to similar parts throughout the several views.

In order to attain the object of my invention, I construct four semicylindrical brasses B B' and C C', with the forward openings smaller than the openings in the other end. The forward opening is also much larger than the opening of the steam chest or cylinder, the object being to allow the gland 8 to be screwed upon the brasses C C' in such a way as not to interfere with the feeding of the oil from the oil-cup to the rod. The inner edges of the forward opening in the parts B B' are beveled, as indicated by 10, the object of which is to force the packing to a tight joint around the rod, and thus prevent all leakage at the seams of the parts B B'. Upon the top of B', I cut an elliptical or rectangular opening 1, which extends a sufficient distance lengthwise along said B' so that the opening 2 in C' shall always be beneath it as the said C' is moved forward and back.

The parts B B' are fitted together, the part B' upon the part B, and thus placed into the stuffing-box 3, the forward end being set flush to the shoulder of the stuffing-box.

The parts C C' are constructed so as to be slightly smaller than B B', and upon the inner side of the forward opening I construct a sluiceway extending around the entire inner circumference of the two halves. Upon the top of the part C' and over the sluiceway 4 I drill a hole 2, opening into the said sluiceway, through which the oil from the oil-cup 5 flows. The opening in the forward end of C C' is a trifle larger than the rod 7, thus insuring a perfect and constant lubrication of the rod by allowing the oil to soak through the packing 6.

Upon the stuffing-box a hole is drilled for the oil-cup 5.

The parts C C' are placed together in a similar manner to B B', with the hole 2 underneath the elliptical or rectangular opening 1 of B'. Around the rod 7 and inside the parts B B' the packing is placed. The parts C C' are then inserted into the opening of B B' and packing similarly placed in C C'. The gland 8 is then fitted into the opening of the parts C C' and regulated by the screws 9.

Having thus described my invention, I claim—

1. In a device for oiling piston-rods or valve-stems on engines inside of the stuffing-box, the combination with the stuffing-box, of the semicylindrical brasses B, B' having their forward inner edges beveled, said brasses being placed one upon the other, the upper portion thereof having an elliptical or rectangular opening, both fitting close to the shoulder of the stuffing-box, and the semicylindrical brasses C, C' having upon their forward inner edges a sluiceway and being placed one upon the other and fitting into the parts B, B', substantially as described.

2. In a device for oiling piston-rods or valve-stems on engines inside of the stuffing-box, the combination with the stuffing-box, of the semicylindrical brasses B, B' and C, C', the said brasses C, C' fitting into the parts B, B' and having upon their forward inner edges a sluiceway, the upper portion being provided with an opening leading from the oil-cup to the sluiceway, and the said oil-cup 5, substantially as described.

GEORGE H. MERRITT.

Witnesses:
WILLIAM C. GREENE,
H. M. YOUNG.